US006755260B1

(12) United States Patent
Allan

(10) Patent No.: US 6,755,260 B1
(45) Date of Patent: Jun. 29, 2004

(54) PNEUMATIC TOOL

(75) Inventor: David Thomson Allan, Glasgow (GB)

(73) Assignee: MacDonald Air Tools Limited (GB)

( * ) Notice: Subject to any disclaimer, the term of this patent is extended or adjusted under 35 U.S.C. 154(b) by 33 days.

(21) Appl. No.: 10/009,176

(22) PCT Filed: Jun. 1, 2000

(86) PCT No.: PCT/GB00/02079

§ 371 (c)(1),
(2), (4) Date: Dec. 10, 2001

(87) PCT Pub. No.: WO00/76731

PCT Pub. Date: Dec. 21, 2000

(30) Foreign Application Priority Data

Jun. 10, 1999 (GB) .......................................... 9913463
Sep. 7, 1999 (GB) .......................................... 9921036

(51) Int. Cl.$^{7}$ .......................... B25D 17/04; B23B 45/04
(52) U.S. Cl. ..................... 173/162.2; 173/168; 173/169
(58) Field of Search ........................... 173/162.2, 162.1, 173/169, 168

(56) References Cited

U.S. PATENT DOCUMENTS

| | | | | | |
|---|---|---|---|---|---|
| 1,573,458 | A | * | 2/1926 | Smith | 173/162.2 |
| 1,644,030 | A | * | 10/1927 | Prellwitz | 173/162.2 |
| 2,019,964 | A | * | 11/1935 | Hamerly | 173/162.1 |
| 2,058,583 | A | * | 10/1936 | Forss | 173/162.2 |
| 2,500,036 | A | * | 3/1950 | Horvath | 173/162.1 |
| 2,899,934 | A | * | 8/1959 | Salengro | 173/18 |
| 3,322,211 | A | * | 5/1967 | Alabuzhev et al. | 173/162.2 |
| 3,727,700 | A | * | 4/1973 | Amtsberg | 173/18 |
| 3,847,232 | A | * | 11/1974 | Klushin et al. | 173/168 |
| 3,989,113 | A | * | 11/1976 | Spring et al. | 173/221 |
| 4,071,094 | A | * | 1/1978 | Kilin et al. | 173/211 |
| 4,460,051 | A | * | 7/1984 | Widmer | 173/208 |
| 4,461,204 | A | * | 7/1984 | Emonet | 91/55 |
| 4,558,763 | A | * | 12/1985 | Montabert | 181/230 |
| 4,611,671 | A | * | 9/1986 | Hansson | 173/162.2 |
| 4,673,043 | A | * | 6/1987 | Greppmair | 173/162.2 |
| 4,711,308 | A | * | 12/1987 | Blaas et al. | 173/162.2 |
| 4,921,053 | A | * | 5/1990 | Dobry et al. | 173/162.2 |
| 5,244,521 | A | | 9/1993 | Ligman | |
| 5,269,381 | A | * | 12/1993 | Oscarsson | 173/162.2 |
| 5,322,131 | A | | 6/1994 | Pressley et al. | |
| 5,524,715 | A | * | 6/1996 | Kimberlin et al. | 173/170 |
| 5,749,421 | A | * | 5/1998 | Johansson et al. | 173/162.2 |
| 5,797,463 | A | * | 8/1998 | Winter et al. | 173/211 |
| 5,927,407 | A | * | 7/1999 | Gwinn et al. | 173/162.2 |
| 6,145,899 | A | * | 11/2000 | Kelemen | 294/57 |

FOREIGN PATENT DOCUMENTS

| | | | | |
|---|---|---|---|---|
| EP | 0900632 | | 3/1999 | |
| EP | 0 900 632 | * | 10/1999 | B25B/21/00 |
| GB | 236910 | | 11/1925 | |

* cited by examiner

*Primary Examiner*—Rinaldi I. Rada
*Assistant Examiner*—Paul Durand
(74) *Attorney, Agent, or Firm*—Dorsey & Whitney LLP

(57) ABSTRACT

There is provided an hand-held pneumatic tool which has a body, a tool fitted to the lower end of the body and a handle at the upper end of the body. The handle is connected to the body by a resilient connection means which permits relative actual movement between the handle and the body.

7 Claims, 6 Drawing Sheets

PNEUMATIC TOOL

CROSS-REFERENCE TO RELATED APPLICATIONS

This application is the US national phase application of PCT International Application No. PCT/GB00/02079 filed Jun. 1, 2000.

FIELD OF THE INVENTION

This invention relates to hand held pneumatic tools of the type commonly used as demolition hammers.

BACKGROUND OF THE INVENTION

It is well known to provide a pneumatic tool for use as a demolition hammer, which tool comprises a body forming a cylinder and having a handle at an upper end and a tool receptacle at a lower end, a piston being reciprocable within the cylinder under the action of compressed air so as to strike the tool repetitively. The operator holds the tool with both hands, one hand being on the top handle and the other hand on the body of the tool.

Known tools of this nature impose a high degree of vibration upon the operator. In recent times there has been increasing concern as to the risk to health which such vibration poses, and current health and safety regulations in the United Kingdom are now planned which will try to reduce vibration levels to which operators of such tools may be exposed. There is accordingly a need for a tool of this type which imposes significantly lower vibration upon the operator's hands.

SUMMARY OF THE INVENTION

Accordingly, the present invention provides a hand held pneumatic tool comprising a body which includes a cylinder, a tool holder at a lower end of the body, a handle at an upper end of the body, a piston reciprocable within the cylinder between a lower position in which it strikes a tool in the tool holder and an upper position, an inlet for receiving compressed air, and a first valve means interposed between the inlet and the cylinder so as to cause the piston to reciprocate within the cylinder; and in which the handle is connected to the body by a resilient connection means which permits relative axial movement between the handle and the body; and a hand grip is provided around the body at a location spaced from the handle, the hand grip being connected to the handle for movement therewith.

Preferably, the hand grip is formed integrally with a muffler through which exhaust air from the tool passes.

In one form of the invention, said first valve means is secured to the handle for movement therewith. In an alternative form, said first valve means is secured to the body.

Preferably, the resilient connection means comprises a plurality of guide posts (which may be provided by shouldered bolts) and spring means which may suitably comprise respective coil springs around one or more of said posts.

In a preferred embodiment, the tool further includes flow control means for varying the supply of compressed air from the inlet into the cylinder.

Preferably, said flow control means comprises a second valve means located between the inlet for receiving compressed air and the first valve means.

Preferably, said flow control means is adapted to vary the extent of opening of an air passage connecting said inlet to said first valve means.

Preferably, said flow control means is adapted to vary the compressed air supply in a plurality of discrete steps.

DESCRIPTION OF THE DRAWINGS

Embodiments of the invention will now be described by way of example with reference to the accompanying drawings in which.

DETAILED DESCRIPTION OF THE INVENTION

Figure 1:
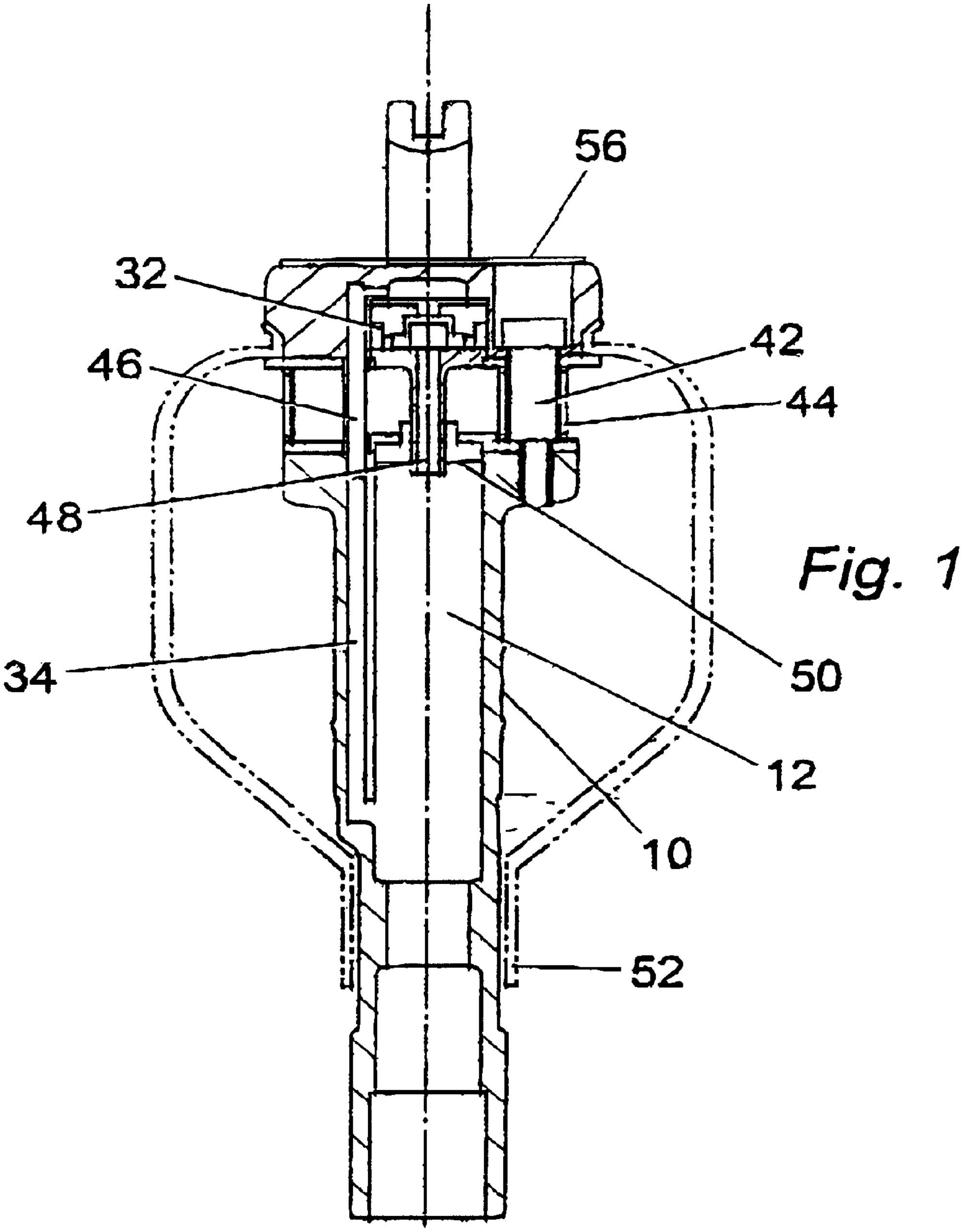
FIG. 1 is a cross sectional side view of a first embodiment of pneumatic tool according to the invention.
Figure 2:
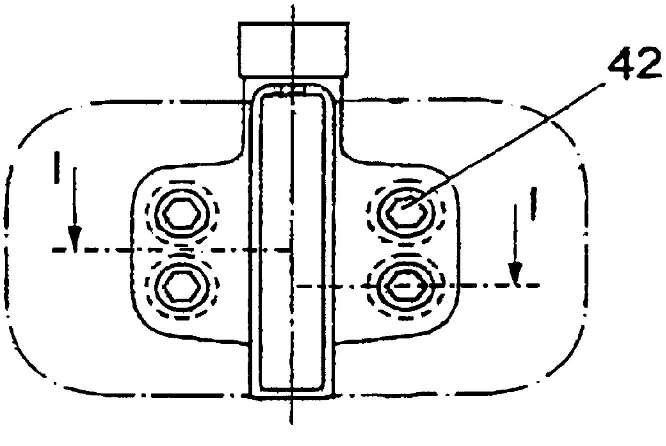
FIG. 2 is a plan view corresponding to FIG. 1.
Figure 3:
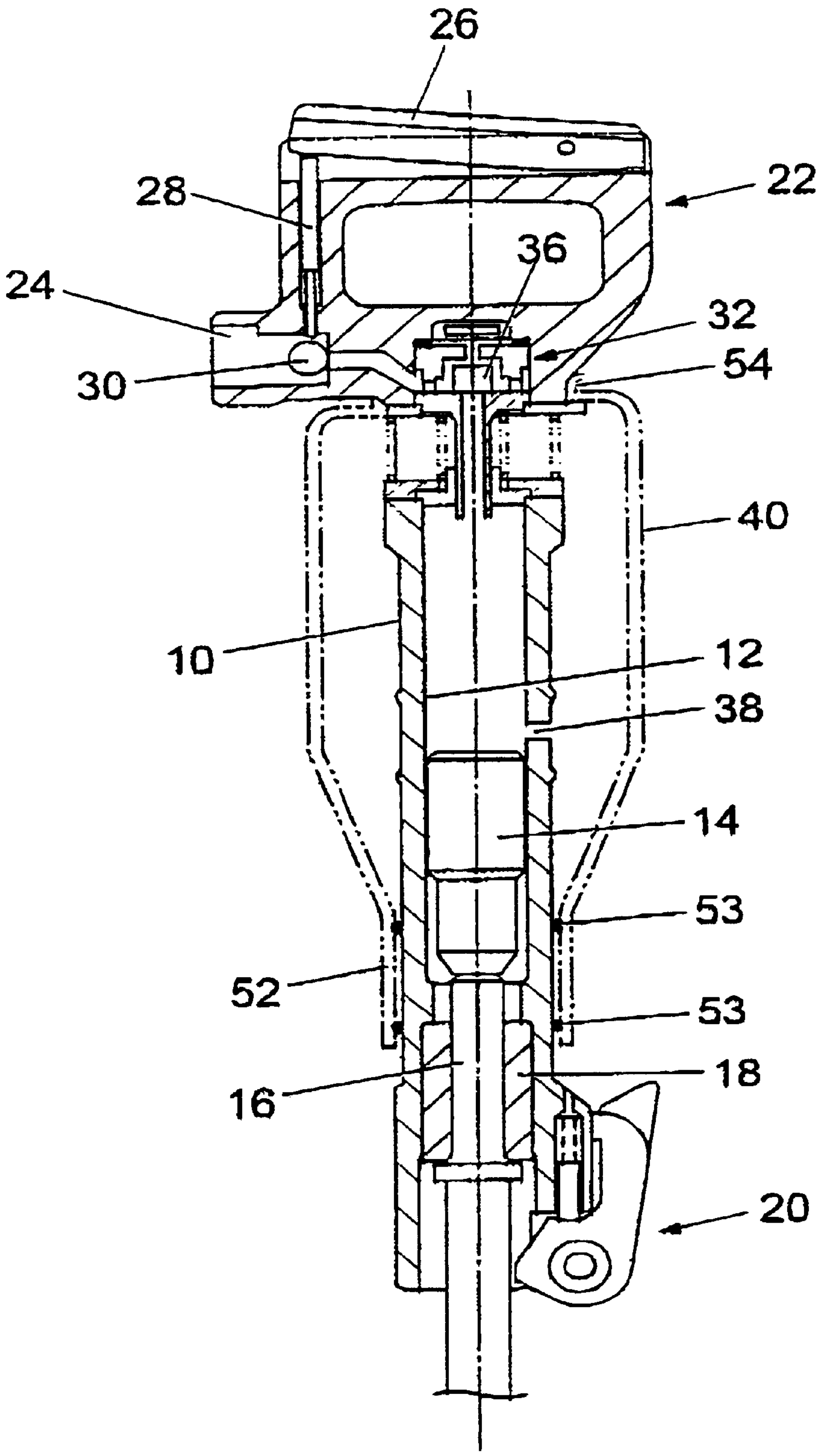
FIG. 3 is a cross sectional end view of the same embodiment.

Referring now to FIGS. 1–3, a first embodiment of the present invention is a pneumatic tool comprising a body 10 which provides a cylinder 12 in which a piston 14 reciprocates so as to strike the shank 16 of a cutting tool received in a tool holder 18 and secured by latch assembly 20.

The upper end of the tool is provided with a handle 22 incorporating an inlet 24 for compressed air. A trigger 26 is used to enable or disable the admission of the compressed air by means of a valve rod 28 bearing on a valve ball 30.

When the trigger 26 is operated, the compressed air supply is communicated to a valve assembly 32 which initially passes compressed air via a transfer passage 34 to the lower part of the cylinder 12 to move the piston 14 upwardly. As the piston 14 rises in the cylinder 12, the air therein is compressed until it reaches a sufficient pressure to lift a valve member 36 of the valve assembly 32, thereby cutting off the supply to the transfer passage 34 and communicating the compressed air supply to the upper part of the cylinder 12 and thus driving the piston downwardly to strike the upper end of the tool shank 16. Exhaust air from this operation passes via an exhaust port 38 into a muffler shroud 40 and thence to the atmosphere via one or more apertures (not shown) in the muffler shroud 40.

The tool as thus far described is largely conventional, but the tool of the present invention is provided with vibration isolating features as will now be described.

The valve assembly 32 is located within a recess of the handle 22, and the latter is secured to the body 10 via four shouldered bolts 42 the lower ends of which are screw threaded in bores in the upper portion of the body 10. One or more of the shouldered bolts 42 is surrounded by a coil spring 44, thus permitting resilient relative axial movement between the handle 22 and the body 10.

To accommodate such movement, the valve assembly 32 communicates with the transfer passage 34 via a short tube

46 which is fixed in the handle 22 and slidable within the transfer passage 34. Also, the valve assembly 32 communicates with the upper part of the cylinder 12 via a tubular extension member 48 slidable within a seal 50 in the upper end of the cylinder 12.

A second hand grip for the operator is provided by a cylindrical portion 52 of the muffler shroud 40 in a lower part of the tool. The portion 52 may be provided with rubber rings 53 bearing on the body 10; these act primarily as wear members and do not require to make a gas-tight seal. The opposite end 54 of the muffler shroud 40 is secured to the handle 22 by means of a plate 55 (which is fixed to the handle 22 by screws) and a clip surrounding the opposite end 54 of the muffler shroud 40. A sealing plate 56 is glued to the handle 22 so as to close the access bores for the shouldered bolts 42 and thus prevent leakage of compressed air via those bores.

Figure 4:
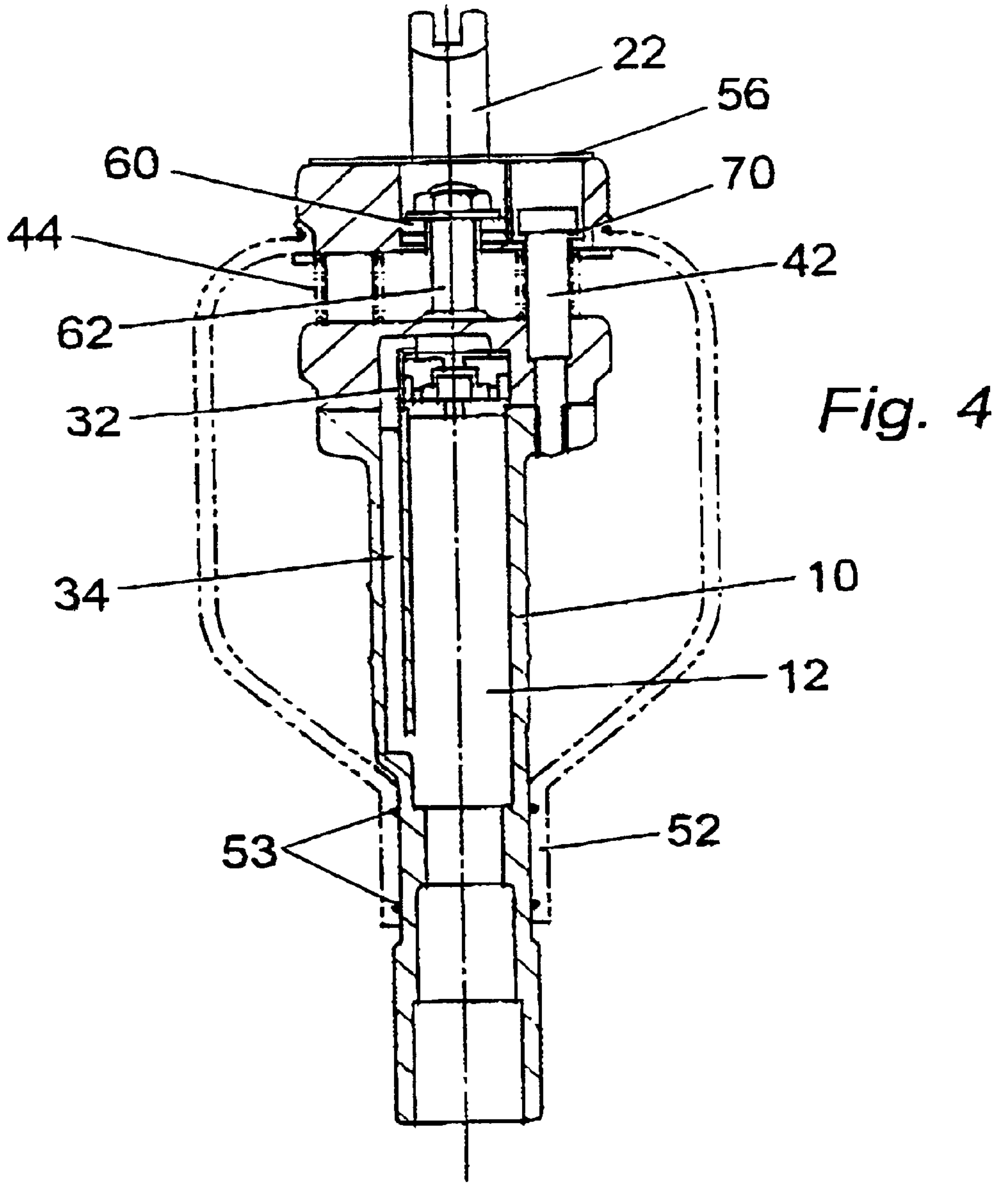
FIG. 4 is a cross sectional side view of a second embodiment.
Figure 5:
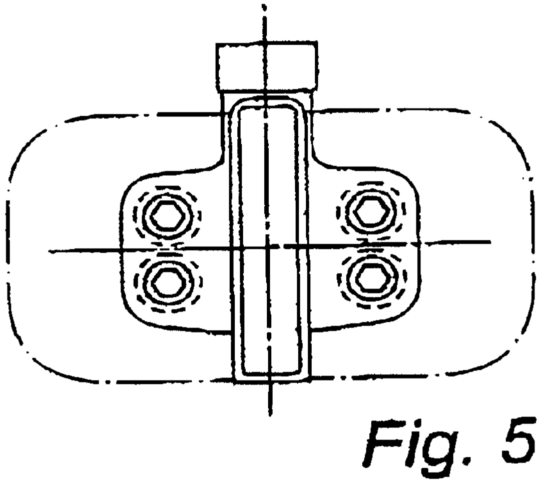
FIG. 5 is a plan view corresponding to FIG. 4.
Figure 6:
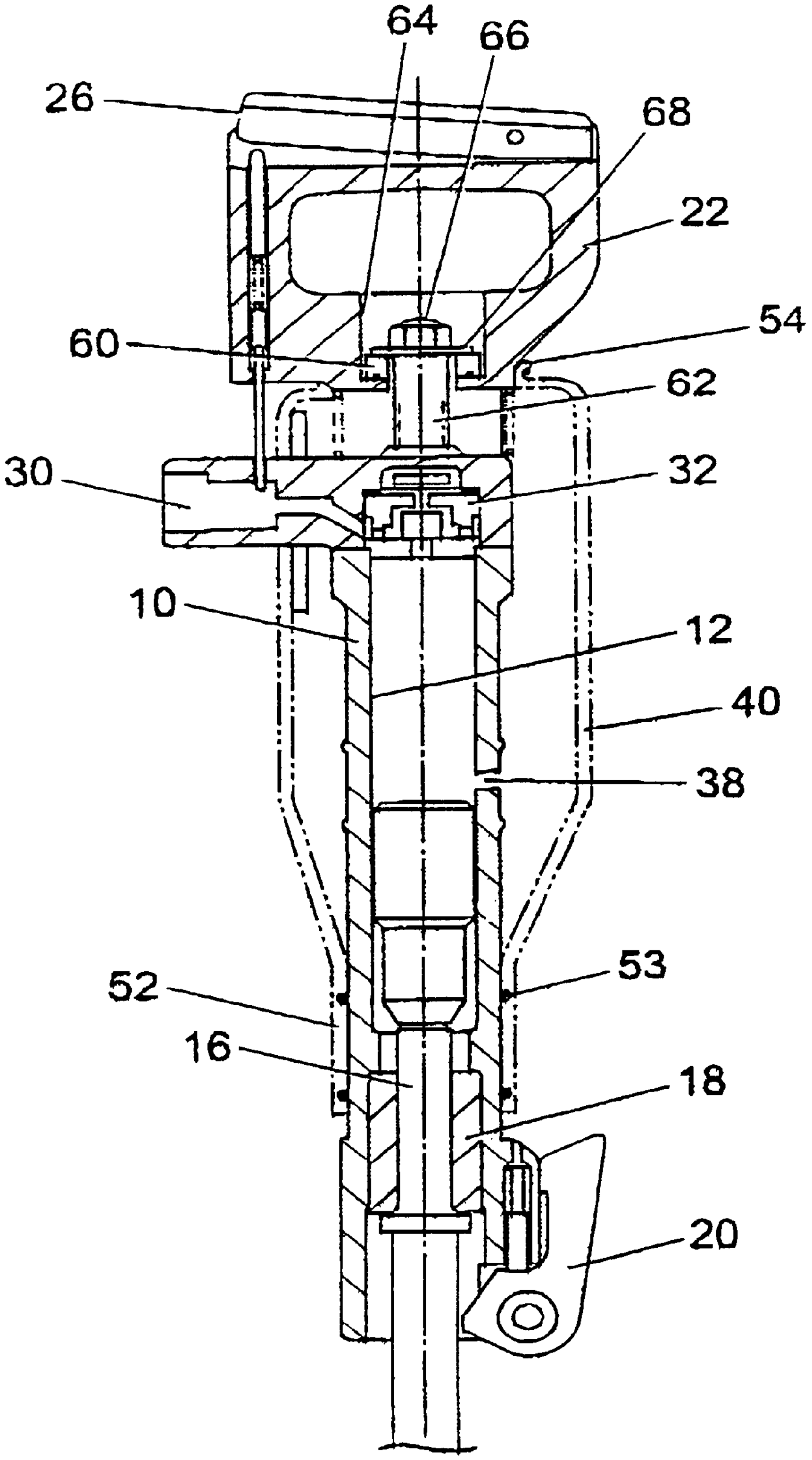
FIG. 6 is a cross sectional end view of the second embodiment.

Turning to FIGS. 4–6, the second embodiment is similar to the embodiment already described and like parts are denoted by like reference numerals. In this embodiment however the valve assembly 32 and the compressed air inlet 24 are located in an upper portion of the body 10. The valve rod 28 is connected to the compressed air inlet 24 by an extension rod 50.

The body 10 is connected to the handle 22 by means of shouldered bolts 42 and coil springs 44 as before. In addition, however, a rod 62 welded to the top of the body 10 passes into a bore 64 of the handle 22 and mounts a nut 66 and washer 68 which bear on a rubber ring 60. This feature is particularly designed for use in the situation where the operator pulls the tool backwards while continuing to operate it, with the rubber ring acting as an isolator during such reverse movement to minimize the transmission of vibration of the body 10 to the operator's hands. To accommodate such use, a clearance 70 is provided under the head of each bolt 42. As an alternative, or in addition, rubber buffers could be provided under the bolt heads.

Figure 7:
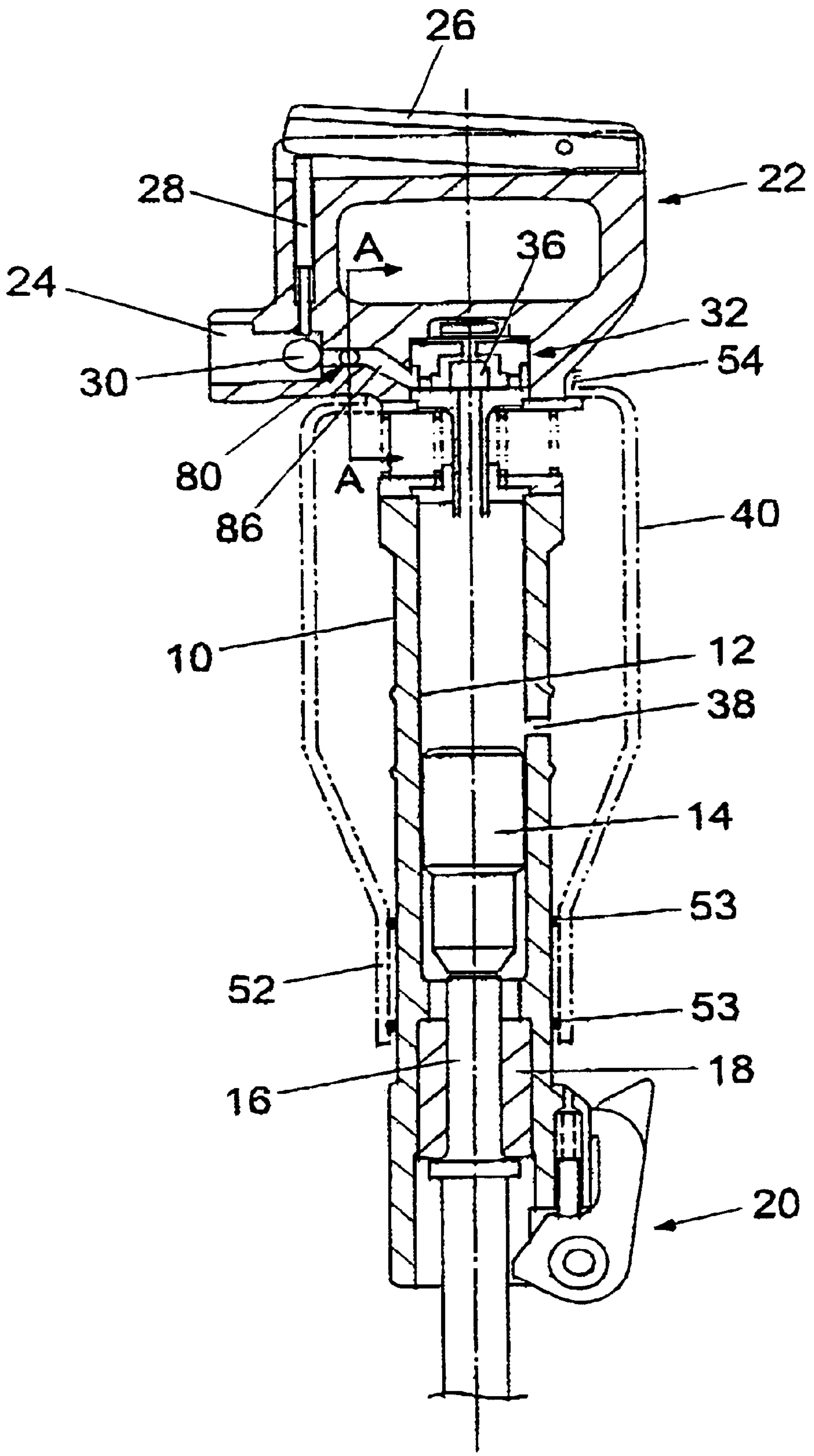
FIG. 7 is a cross sectional end view of a preferred embodiment of the present invention.

FIG. 7 shows a preferred embodiment of the present invention. This is substantially similar to the embodiment of FIGS. 1 to 3, except as discussed below.

The embodiment of FIG. 7 includes flow control means comprising a second valve 80 positioned between the inlet for compressed air 24 and the first valve assembly 32. The second valve 80 is used to control the flow of compressed air to the first valve assembly 32.

The degree of vibration transferred from the tool to the operator's hands varies with the hardness of the material being worked on. In the previous embodiments, a greater degree of vibration will be transferred to the operator's hands when relatively soft materials are being worked on than with relatively hard materials. It has been found that the degree of vibration can be controlled by varying the supply of compressed air to the tool. The flow control means 80 of this embodiment enables the supply of compressed air to the valve assembly 32 to be varied to suit the hardness of the material being worked on.

In practice, it has been found that optimum conditions exist for different materials for minimising the vibration transferred to the tool operator whilst ensuring that sufficient compressed air reaches the piston 14 of the tool to allow the tool to function properly, as follow:

| | |
|---|---|
| Non-homogeneous sand and "friable" materials such as coal | valve approximately 25% open |
| Limestone, soft rocks, heavy clay | valve approximately 50% open |
| Concrete | Valve approximately 100% open. |

The second valve means 80 can be of any type which allows the flow of air to the valve assembly 32 to be controlled. Preferably, the second valve means 80 can be set in a plurality of discrete positions to suit different materials, but could be continuously adjustable. The valve 80 should be lockable in the desired position so that its setting cannot be altered accidentally or by the action of the compressed air.

Figure 8:
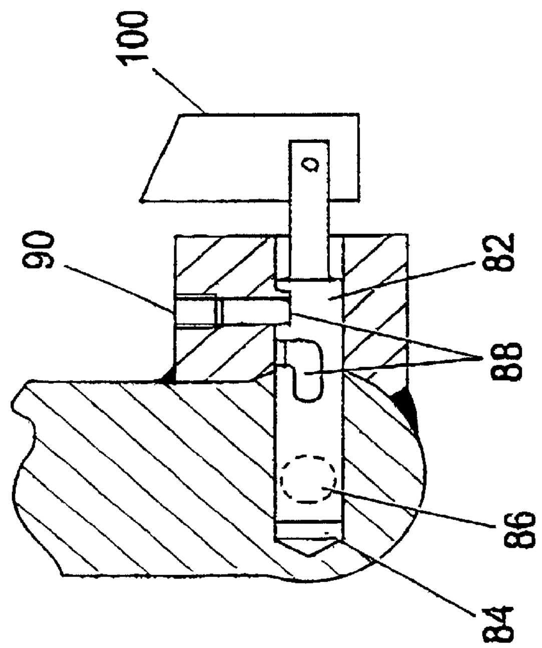
FIG. 8 is a fragmentary sectional view on line A'—A' of FIG. 7, illustrating a flow control valve.

FIGS. 8 and 9 illustrate an embodiment of a suitable flow control valve 80, comprising a generally cylindrical rod member 82 slidably located in a bore 84 which extends transversely to and intersects the air passage 86 connecting the air inlet 24 to the valve assembly. When the rod member 82 is positioned fully home in the bore 84, as illustrated in FIG. 8, the rod member closes the air passage 86, isolating the valve assembly 32 from the compressed air inlet 24. By sliding the rod member out of the bore (towards the right hand side as seen in FIG. 8), the air passage may be opened partially or completely depending on the position of the rod member 82, thereby controlling the supply of compressed air to the valve assembly 32.

Figure 9A:
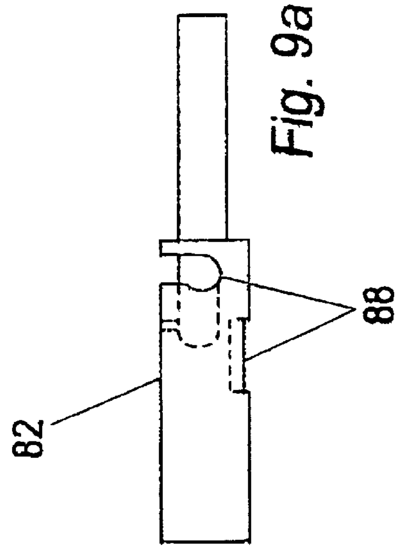
FIG. 9A is a side view of a rod member forming party of the flow control value of FIG. 8.
Figure 9B:
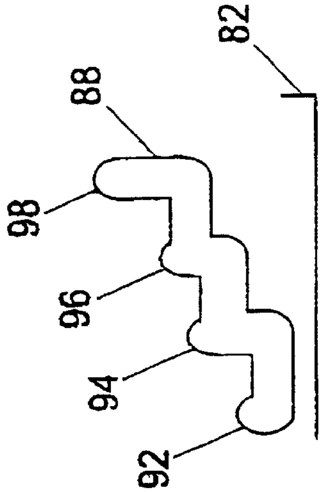
FIG. 9B is a development of a slot formed in the surface of the rod member of FIG. 9A.

In this embodiment, the rod member 82 may be set in one of four discrete positions by means of a stepped slot 88 formed in the surface of the groove and extending around the circumference thereof, as illustrated in FIGS. 9A and 9B, which cooperates with a locking screw 90 which extends into the bore 84. The rod member 82 may thus be set in one of the four positions defined by the slot 88 by rotating and advancing or retracting the rod member 82 in the bore 84. As is best seen in FIG. 9B, the slot 88 defines four rotational positions 92, 94, 96 and 98 at 0°, 90°, 180° and 270°. Position 92 corresponds to the rod member 82 being fully home as seen in FIG. 8, closing the air passage 86. Position 94 corresponds to a first partially retracted position of the rod member 82, such that about 25% of the area of the air passage 86 is exposed (for soft materials). Position 96 corresponds to a second partially retracted position of the rod member 82, such that about 50% of the area of the air passage 86 is exposed (for medium hardness materials). Position 98 corresponds to a fully retracted position of the rod member 82, such that 100% of the area of the air passage 86 is exposed (for hard materials).

The rod may be manipulated by means of a handle member 100 and locked in the desired position by means of the screw 90.

The illustrated flow control valve may be replaced by any equivalent flow control means providing either discrete or continuous adjustment of the compressed air supply to the valve assembly 32. Similar flow control means could also be incorporated in the embodiment of FIGS. 4 to 6.

Modifications to the foregoing may be made in the scope of the present invention.

What is claimed is:

1. A hand held pneumatic tool comprising a body which includes a cylinder, a tool holder at a lower end of the body, a handle at an upper end of the body, a piston reciprocable within the cylinder between a lower position in which it strikes a tool in the tool holder and an upper position, an inlet for receiving compressed air, flow control means for varying the supply of compressed air from the inlet into the cylinder, and a first valve means interposed between the inlet and the cylinder so as to cause the piston to reciprocate within the cylinder; in which the handle is connected to the body by a resilient connection means which permits relative axial movement between the handle and the body; in which a hand grip is provided around the body at a location spaced from the handle, the hand grip being connected to the handle for movement therewith; and in which said first valve means is secured to the handle for movement therewith, and said first valve means communicates with upper and lower parts of the cylinder via tubes fixed with respect to the handle and slidingly received in said body, wherein said flow control means is adapted to vary the extent of opening of an air passage connecting said inlet to said first valve means.

2. A hand held pneumatic tool comprising a body which includes a cylinder, a tool holder at a lower end of the body, a handle at an upper end of the body, a piston reciprocable within the cylinder between a lower position in which it strikes a tool in the tool holder and an upper position, an inlet for receiving compressed air, flow control means for varying the supply of compressed air from the inlet into the cylinder, and a first valve means interposed between the inlet and the cylinder so as to cause the piston to reciprocate within the cylinder; in which the handle is connected to the body by a resilient connection means which permits relative axial movement between the handle and the body; in which a hand grip is provided around the body at a location spaced from the handle, the hand grip being connected to the handle for movement therewith; and in which said first valve means is secured to the handle for movement therewith, and said first valve means communicates with upper and lower parts of the cylinder via tubes fixed with respect to the handle and slidingly received in said body, wherein said flow control means comprises a second valve means located between the inlet for receiving compressed air and the first valve means.

3. A hand held pneumatic tool as claimed in claim 2 wherein the hand grip is formed integrally with a muffler through which exhaust air from the tool passes.

4. A hand held pneumatic tool as claimed in claim 2 wherein said flow control means is adapted to vary the compressed air supply in a plurality of discrete steps.

5. A hand held pneumatic tool as claimed in claim 2 wherein the resilient connection means comprises a plurality of guide posts provided with spring means.

6. A hand held pneumatic tool as claimed in claim 5 wherein the guide posts comprise shouldered bolts.

7. A hand held pneumatic tool as claimed in claim 5 wherein said spring means comprise respective coil springs around one or more of said posts.

* * * * *